INVENTOR
ERIC R. MORAN
GORDON R. JEFFERIES
BY
AGENT 3,167,228
APPARATUS FOR SEPARATING INTO PIECES THIN WAFER SHAPED PLATES OF BRITTLE MATERIAL
Eric Russell Moran and Gordon Ross Jefferies, Southampton, England, assignors to North American Philips Company, Inc., New York, N.Y., a corporation of Delaware
Filed Nov. 21, 1962, Ser. No. 239,237
Claims priority, application Great Britain, Nov. 28, 1961, 42,480/61
4 Claims. (Cl. 225—103)

This invention relates to an apparatus for separating into pieces a plate of germanium, silicon or the like, in which the plate having a plurality of substantially parallel score lines extending along a surface thereof is subjected to bending and separation into pieces is effected along each score line. Such an apparatus is known in U.S.P. 3,105,623. It is used, for example, for separating a plate a germanium or the like into a large number of pieces, said plate being, for example, 1 cm. in diameter and from 1 to 2 mms. thick. In the known method, the plate to be separated is provided on a resilient substratum which is disposed on a flat non-resilient table. The assembly is then moved rectilinearly along a roller having a non-resilient surface whereby the plate is subjected to bending along the successive score lines and broken. The separated pieces are kept together during this process by means of adhesive tape.

An object of the invention is to provide a method in which the plate may be separated into pieces more rapidly and the use of adhesive tape on the plate is no longer necessary.

The method according to the invention is characterized in that, while the plate is placed between two initially separated surfaces of which the surface facing the side of the plate having the score lines is concave and the other surface is convex, a bending moment is exerted by moving said surfaces towards each other.

The convex and concave surfaces are preferably formed into shapes which are also determined by the pattern of the score lines. If this is one series of substantially parallel lines, each of the surfaces preferably forms part of the peripheral surface of a cylinder, the generatrices of the surface then extending parallel with the score lines.

Another embodiment of the method according to the invention may be used for separating into pieces a plate having along one surface two series of substantially parallel score lines which preferably intersect at an angle of 90°. Said embodiment is characterized in that by moving the concave and convex surfaces towards each other, separation is effected simultaneously along both series of score lines. Separation then takes place along all score lines in a single operation. In this case, the concave and convex surfaces are preferably shaped spherically.

A further object of the invention is to provide a device for carrying out the method. Such a device is characterized in that it comprises a die and a counter support between which the plate to be separated may be positioned, that surface of the adjacent surfaces of the die and the counter support which faces the scored side of the plate to be separated being concave and the other surface being convex, and also means being provided to move the die and the counter support towards each other so that a bending moment is exerted on a plate of germanium, silicon or the like present between the surfaces of the die and the counter support whereby separation is effected along each score line.

It is advantageous if one of the adjacent surfaces of the die and the counter support, i.e. preferably the convex surface, is resilient and made, for example, from synthetic rubber.

In one particular embodiment of this device, the counter support is fixedly arranged above the die which is movable in a vertical direction, the concave surface of the counter support being non-resilient and the surface of the underlying die being convex and resilient.

In order that the invention may be readily carried into effect, one embodiment thereof will now be described in detail, by way of example, with reference to the accompanying diagrammatic drawings, in which.

Figure 1:
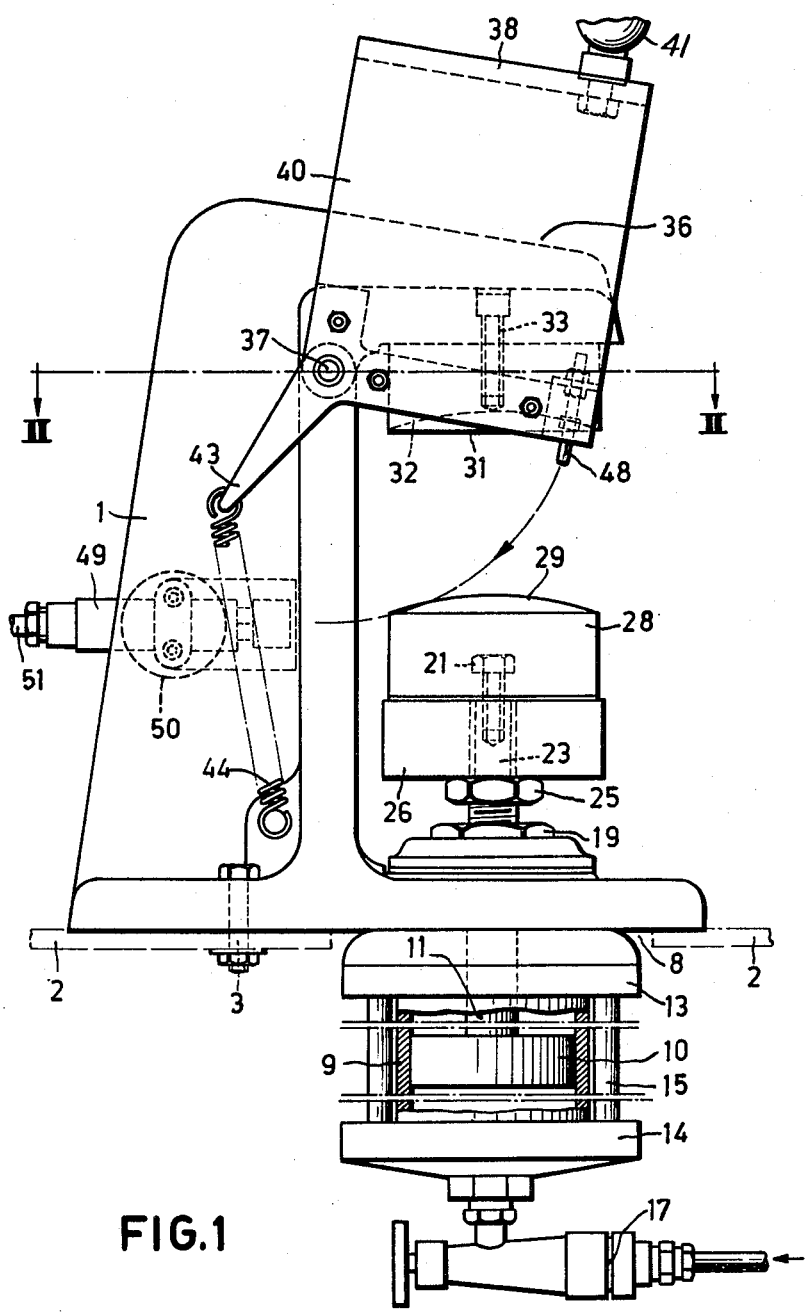
FIG. 1 is a side view of the device according to the invention for separating a plate of germanium or the like into pieces.
Figure 2:
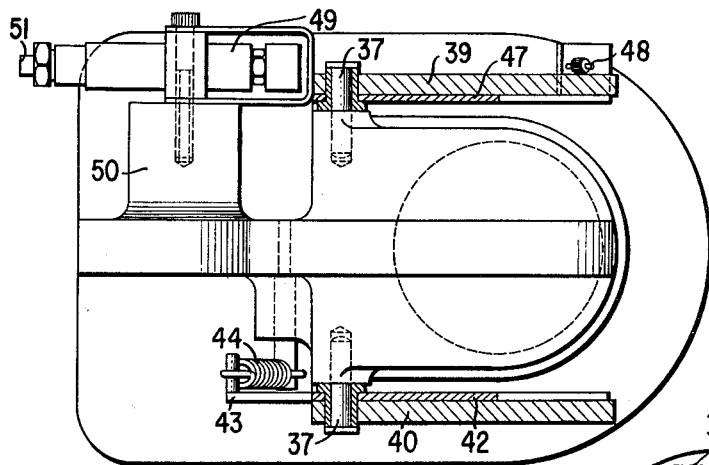
FIG. 2 is a sectional view, taken along the line II—II of FIG. 1.

The device shown in the figures comprises a casting 1 secured to a table board 2 by bolts 3. The casting 1 comprises a plate-shaped part 4, an upright part 5, a head part 6 and a flange-shaped part 7.

Under an aperture 8 in the table board 2 there is arranged a cylinder 9 in which a piston 10 connected to a piston rod 11 is movable. The cylinder 9 is maintained clamped between parts 13 and 14 by means of rods 15. A valve 17 is fitted on the part 14. The part 13, which is threaded, extends through an aperture 18 in the plate-shaped part 4. The cylinder 9 is fixed in position, relative to the casting 1 by means of a nut 19.

The end 23 of the piston rod 11 is also formed with screw-thread onto which a steel part 26 is screwed. This part 26 is secured to the rod 11 by means of a nut 25. A bolt 27 is screwed on edge into the end 23 of the rod 11. A die 28 of resilient synthetic rubber has been moulded around the bolt 27. The surface 29 of the die 28 has a convex shape.

A fixedly arranged part 31 having a concave surface 32 the curvature of which approximately corresponds to that of the convex surface 28, is secured to the head part 6 by screws 33 passing through apertures 34 in the head part 6.

A shielding cap 36 is pivotally secured to the casting 1 by pivots 37 and comprises a disc 38 provided with side plates 39 and 40. A lever 41 is attached to the disc 38. A plate 42 (47) is secured to the side plate 40 (39) and part thereof is formed as an arm 43 to which one end of a spring 44 is attached. The other end of this spring engages behind the wall of the aperture present in a thicker part 45. An adjustable pin 48 is fitted on the plate 47.

Figure 3:
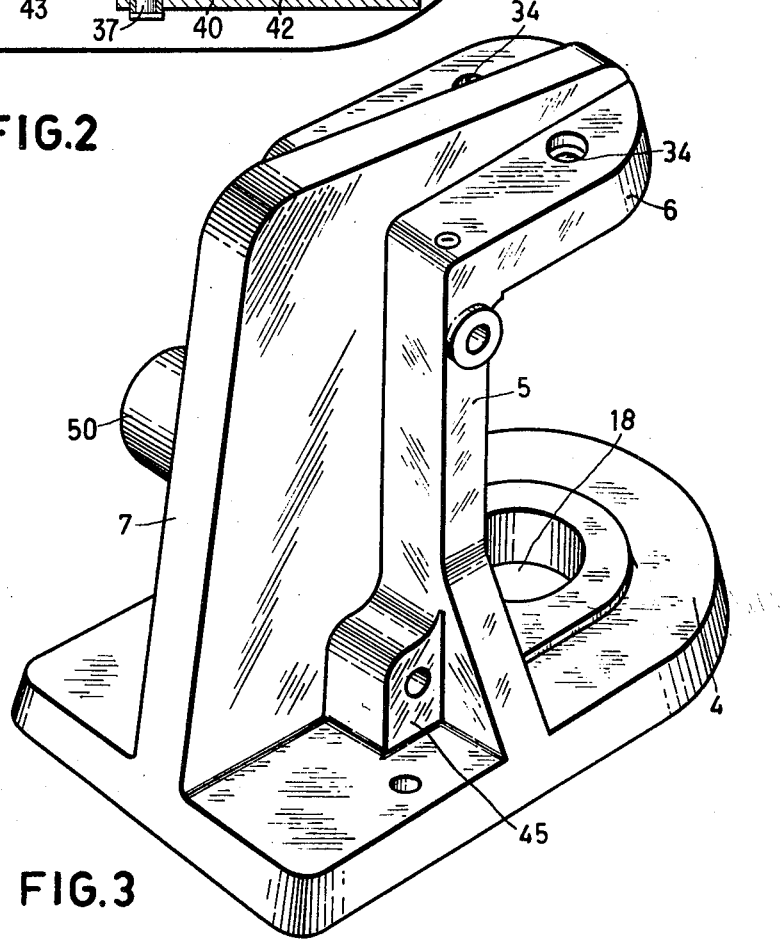
FIG. 3 is a perspective view of part of the structure shown in FIG. 1.

A valve 49 connected to a pressure air supply 51 is mounted on a projection of the casting 1, indicated by 50 in FIG. 3, and is adapted to co-operate with the pin 48. The supply of pressure air to the valve 17 and hence to the lower side of the piston 10 may be established through the valve 49.

The operation of the device is as follows:

Start is made from a condition in which the surfaces 32 and 29 are separated. A plate of germanium or silicon and hence of brittle material is disposed on the resilient surface 29 having a radius of curvature which is actually larger than that shown. The side of the plate which has preliminarily been provided with two series of parallel score lines intersecting one another at about 90° has to face the concave surface 32.

By pushing the lever 41 downwards, the pin 48 is moved along a path shown in broken line and may co-act with the valve 49 in its final position. In this position, the side plates 40 and 39 are situated at the sides of the surfaces 29 and 32. The pin 48 now operates the valve 49 whereby pressure air of, for example, 3 to 7 atmospheres can pass through the valve 17 to the lower side of the piston 10. As a result, the piston rod, together with the die 28, is moved upwards. The germanium plate to be separated into pieces, which is also transported, then engages the concave surface 32 which fulfills the function of a counter support for the die. At the end of said movement, the plate is subjected to bending.

Since the die 28 is of synthetic rubber and hence resilient, the surface 29 will be deformed when the surfaces 32 and 29 are moved towards each other, whereby bending moments occur along all score lines, thus causing the germanium plate to break along these lines. At the end of the upward movement of the die 28 against the counter support 31, the plate which is then broken to pieces is clamped between the said surfaces.

By releasing the lever 41, the spring 44 can relax and the shielding cap is moved back to its initial position (shown). The pin 48 is then again remote from the valve 49. This valve 49 is so constructed that, after its removal, the pressure below the piston 10 disappears and the die 28 moves downwards by the action of its own weight. This downward movement may also be brought about by a compression spring which is arranged above the piston and which relaxes when the pressure air is removed from below the piston.

The plate broken into pieces, which has remained on the upper side of the die 28 during the downward movement of the piston, may be removed by hand. As an alternative, the pieces may be blown away in the lateral direction to a container.

What is claimed is:

1. Apparatus for separating a plate of brittle material such as germanium, silicon and the like having score lines on a major surface thereof; said apparatus comprising a support member, a first and second means including a die and counter-support mounted on said support member for relative axial movement, the coacting surfaces of said die and counter-support between which said plate is positioned defining substantially complementary generally concave and convex shapes, and means for moving said first and second means together and apart.

2. Apparatus for separating a plate of brittle material such as germanium, silicon and the like having score lines on a major surface thereof; said apparatus comprising a support member, a first and second means mounted on said support member for relative movement, said first and second means including a die and counter-support between which said scored plate to be diced is positioned, one of said die and counter-support being constituted of resilient material and the coacting surfaces thereof defining substantially complementary concave and convex shapes, and means for moving said first and second means together and apart.

3. Apparatus according to claim 2, wherein said die is convex shaped and constituted of resilient material and mounted for movement relative to said counter-support which is fixedly secured axially above said die on said support member.

4. Apparatus for separating a plate of brittle material such as germanium, silicon and the like having score lines on a major surface thereof; said apparatus comprising a support, means fixedly mounting a counter-support member on said support in an elevated position, a die member constituted of resilient material and means for moving said die member axially relative to said counter-support member, said die member having a convex surface adjacent said counter-support member and said counter-support member having a complementary concave recess for receiving said convex surface, and a shielding cap means pivotally supported on said support for enclosing said die and counter-support during movement thereof for separating a plate positioned therebetween.

References Cited in the file of this patent

UNITED STATES PATENTS

| | | |
|---|---|---|
| 581,165 | Kennedy | Apr. 20, 1897 |
| 2,280,204 | Tracy | Apr. 21, 1942 |
| 2,825,405 | Maass et al. | Mar. 4, 1958 |
| 2,970,730 | Schwarz | Feb. 7, 1961 |
| 3,040,489 | Da Costa | June 26, 1962 |
| 3,105,623 | Hobbs | Oct. 1, 1963 |